Oct. 11, 1949.  M. D. HUSTON  2,484,166
ELECTRIC MOTOR
Filed March 11, 1948
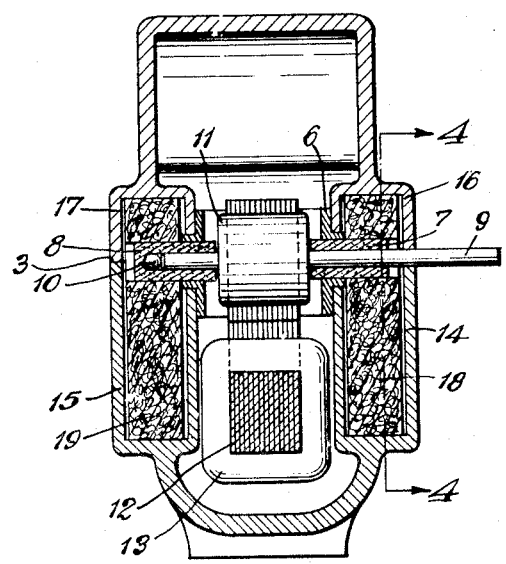
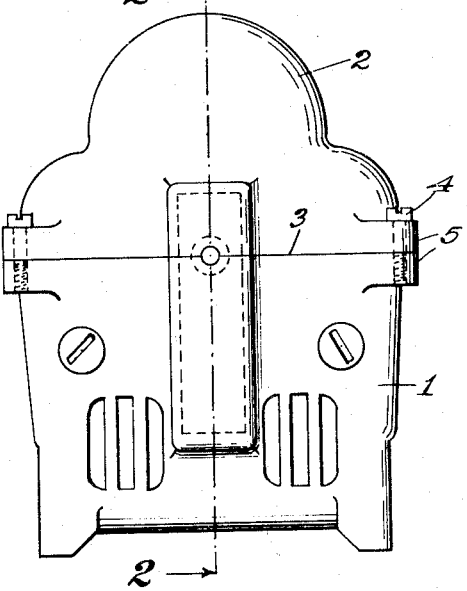
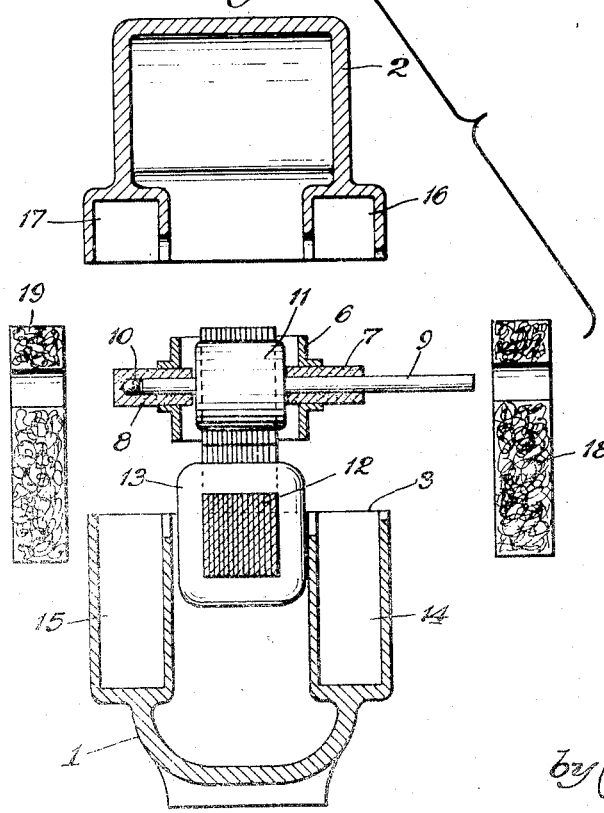
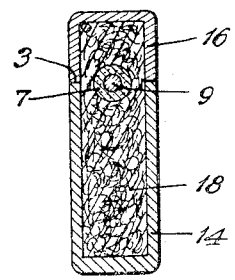
Inventor
Milton D. Huston
by Parker & Carter
Attorneys.

Patented Oct. 11, 1949

2,484,166

UNITED STATES PATENT OFFICE 2,484,166

ELECTRIC MOTOR

Milton D. Huston, Santa Fe, N. Mex., assignor to Breese Burners, Inc., Santa Fe, N. Mex., a corporation of Delaware Application March 11, 1948, Serial No. 14,204

3 Claims. (Cl. 172—36)

My invention relates to improvements in electric motors and has for one object, a new and improved lubricating device for an electric motor.

Another object is to provide a lubricating system for electric motors which may be filled with lubricant and the motor may be shipped with lubricant in place without danger of wastage or spillage, no matter what position the motor assumes during shipment, installation or operation.

Another object of my invention is to provide a lubrication system for an electric motor wherein the amount of lubricant may be accurately adjusted and wherein a minimum amount of lubricant may be used without danger of starving the motor.

The motors in which I am interested are booster motors used in connection with oil burners. These motors are subjected to relatively high heat, not so much as a result of motor operation but as a result of the fact that the motors must be placed very close to the burner pot which is supplied with air by a fan driven by the motor. Under these circumstances, usual conventional types of lubricant oxidizes at a very high rate and lubrication failure results. This makes it necessary to use a special type of exceedingly expensive lubricating oil and that make it undesirable to fill the motor housing with oil as is the usual practice.

I propose therefore, to build or cast into the housing containing the motor, a relatively small lubricant well which will be intimately associated only with the motor bearing so that all or substantially all of the oil contained within the well will be available for the bearing.

My invention is illustrated more or less diagrammatically in the accompanying drawing wherein:

Figure 1 is an end elevation of the motor housing;

Figure 2 is a section along the line 2—2 of Figure 1;

Figure 3 is an exploded section similar to Figure 2 showing the two halves of the housing; the lubricant wick and the motor parts about to be assembled;

Figure 4 is a section along the line 4—4 of Figure 2;

Like parts are indicated by like characters in the drawings.

The motor housing comprises a lower housing section 1 and an upper housing section 2 joined along the parting line 3. The sections 1 and 2 are held together by cap screws 4 in lugs 5.

6 is the motor frame; it carries motor bearings 7 and 8 which support a motor shaft 9. This shaft extends clear through the bearing 7 and penetrates the bearing 8 engaging the thrust bearing ball 10. These bearings are oilite or other porous bearings which can be lubricated by the application of lubricant to the outside of the bearing, the lubricant penetrating through the bearing to lubricate the shaft bearing surface.

11 is the armature on the shaft 9. The shaft 9 may carry a fan or any other load. 12 is the field core. It is carried by the frame 6 and in turn carries a field coil 13; all those parts being adapted to be contained within a motor housing.

Cast integral with the two side walls of the housing are oil wells 14, 15 closed at the bottom, open at the parting between the housing sections 1 and 2. Cast integral with the section 2, extending above and in alignment with the oil wells 14, 15 are wick chambers 16, 17. 18 and 19 are wicks of felt or similar absorbent material apertured to engage the bearings 7 and 8 and of such size as to substantially fill the chamber defined by the wells 14, 15 and wick chambers 16, 17. The apertures in the wicks are such that they closely engage the outer surface of the bearings 7 and 8.

The use and operation of my invention are as follows:

The two parts of the motor housing are, as above indicated, preferably cast though they may be assembled by welding, stamping or other suitable means. The motor including the frame, bearings, shaft and armature are assembled in the usual manner. The two wicks are threaded on to the two bearings. The wells are filled with oil or the wicks saturated with oil and the motor frame with the wicks, is dropped into the lower part of the housing; each wick filling its respective well and the motor frame engaging the inner walls of the housing. The upper part of the housing is then assembled to enclose the bearings and wicks, and the screws are then tightened up to lock the two parts together. The partings between the upper and lower portions of the frame are parallel and make a close fit.

Thus each wick is held in its own well which is filled with wick and oil. The wicks are thus held in close intimate contact with the outer peripheries of each of the two bearings and the oil in the wick enters the bearings by capillary attraction, travels through the bearings to lubricate bearing surfaces.

Under these circumstances, it makes no difference what the position of the motor may be. The oil is held in place in the two wells being held in the saturated wick and as long as there is any oil in the wick, that oil will reach the bearing without spillage or waste.

I claim:

1. In combination, an electric motor, a housing therefor, comprising at least two separable motor enclosing sections, the motor including a shaft and bearings, the axis of the shaft and bearings being located in the plane defining the opposed faces of the separable sections, oil reservoirs integral with the walls of the sections and extending on both sides of such plane, wicks completely filling the reservoirs, apertured to encircle and engage the bearings.

2. In combination, an electric motor, a housing therefor, comprising at least two separable motor enclosing sections, the motor including a shaft and bearings, the axis of the shaft and bearings being located in the plane defining the opposed faces of the separable sections, oil reservoirs integral with the walls of the sections and extending on both sides of such plane, wicks completely filling the reservoirs, apertured to encircle and engage the bearings, the reservoirs being separated from that portion of the housing which contains the motor itself.

3. In combination, an electric motor, a housing therefor, comprising at least two separable motor enclosing sections, the motor including a shaft and bearings, the axis of the shaft and bearings being located in the plane defining the opposed faces of the separable sections, oil reservoirs integral with the walls of the sections and extending on both sides of such plane, wicks completely filling the reservoirs, apertured to encircle and engage the bearings, the reservoirs being separated from that portion of the housing which contains the motor itself, the motor bearings extending between the reservoirs and the interior of the housing.

MILTON D. HUSTON.

REFERENCES CITED

The following references are of record in the file of this patent:

UNITED STATES PATENTS

| Number | Name | Date |
| --- | --- | --- |
| 1,182,092 | Kerby | May 9, 1916 |
| 1,540,038 | Spielman | June 2, 1925 |
| 1,896,972 | Redmond | Feb. 7, 1933 |
| 2,306,743 | Morrill | Dec. 29, 1942 |